US 6,573,316 B1

(12) United States Patent
Albrecht et al.

(10) Patent No.: US 6,573,316 B1
(45) Date of Patent: Jun. 3, 2003

(54) STABILIZED WATER-SOLUBLE POLYMER POWDERS ON THE BASIS OF POLYOXY ALKYLENE GLYCOL CARBOXYLATES AND METHOD FOR PRODUCING SAME

(75) Inventors: Gerhard Albrecht, Tacherting (DE); Josef Weichmann, Pleiskirchen (DE); Konrad Wutz, Trostberg (DE); Manfred Bichler, Engelsberg (DE); Alfred Kern, Kirchweidach (DE)

(73) Assignee: SKW Bauchemie GmbH, Trostberg (DE)

( * ) Notice: Subject to any disclaimer, the term of this patent is extended or adjusted under 35 U.S.C. 154(b) by 0 days.

(21) Appl. No.: 09/720,922

(22) PCT Filed: Sep. 23, 1999

(86) PCT No.: PCT/EP99/07103

§ 371 (c)(1),
(2), (4) Date: Dec. 28, 2000

(87) PCT Pub. No.: WO00/17263

PCT Pub. Date: Mar. 30, 2000

(30) Foreign Application Priority Data

Sep. 24, 1998 (DE) .......................... 198 43 730

(51) Int. Cl.$^7$ .............................. C08K 5/34; C08K 5/37
(52) U.S. Cl. ...................... 524/96; 524/100; 524/106
(58) Field of Search .................... 524/96, 99, 100, 524/104, 106

(56) References Cited

U.S. PATENT DOCUMENTS

| 4,444,676 A | 4/1984 | Statton et al. | |
| 5,021,479 A | * | 6/1991 | Ravichandran et al. ....... 524/96 |

FOREIGN PATENT DOCUMENTS

| CH | 628 657 | 11/1959 |
| DE | 1 056 370 | 4/1959 |
| DE | 1 069 873 | 11/1959 |
| DE | 1 082 733 | 6/1960 |
| DE | 1 218 729 | 6/1966 |
| DE | 25 30 004 | 1/1976 |
| DE | 25 57 619 | 7/1976 |
| DE | 30 11 561 | 10/1980 |
| DE | 38 42 945 | 2/1990 |
| DE | 44 20 444 | 3/1995 |
| DE | 44 21 722 A | 1/1996 |
| DE | 1214398 | 4/1996 |
| EP | 0 038 876 | 11/1981 |
| EP | 140 297 | 5/1985 |
| GB | 949 992 A | 2/1964 |

OTHER PUBLICATIONS

Patent Abstract JP 401 3771 A (Jan. 17, 1992).
Patent Abstract JP 61097352 A (May 15, 1986).
Patent Abstract JP 60112404 A (Jun. 18, 1985).

* cited by examiner

*Primary Examiner*—Robert D. Harlan
(74) *Attorney, Agent, or Firm*—Fulbright & Jaworski L.L.P.

(57) ABSTRACT

Stabilized, water-soluble polymer powders based on polyoxyalkylene glycol carboxylates are described, wherein the powders comprise from 0.01 to 10% by weight of a stabilizer selected from the group consisting of phenols, amines, phosphites, thioethers, and also thioacids, and where the stabilizer was added in liquid or dissolved form to the aqueous polymer solution prior to its conversion into the powder form. The polymer powders thus protected against autoignition and oxidative degradation have unexpectedly high thermooxidative stability, even on exposure to high temperatures and oxidizing action (air, oxygen).

29 Claims, No Drawings

STABILIZED WATER-SOLUBLE POLYMER POWDERS ON THE BASIS OF POLYOXY ALKYLENE GLYCOL CARBOXYLATES AND METHOD FOR PRODUCING SAME

FIELD OF THE DESCRIPTION

The present invention relates to water-soluble polymer powders which have been stabilized, i.e. protected against autoignition and oxidative degradation, and which are based on polyoxyalkylene glycol carboxylates, and also to a process for their preparation.

BACKGROUND OF THE INVENTION

Water-soluble polymers based on oxyalkylene glycols and carboxylic acid derivatives have very recently obtained a large number of applications. Besides their use as dispersion stabilizers in the preparation of water-soluble copolymers (WO 97/30094) they are also used, inter alia, as a stabilizing agent (protective colloid) in the preparation of caking-resistant dispersion powders.

However, they are preferably used, and used in large quantities, as a flow agent for hydraulic binders, such as cement, lime, and also calcium-sulfate-bonded construction materials (EP-A 838 444), as pigment dispersants in the coatings and colorants sector, as processing aids for clays and porcelain slips in the sectors of ceramics and refractories (DE-A 43 00 239) and also in petroleum production. The structural variety of products of this type extends from copolymers with a random, alternating, block or comb-like structure made from a structural unit containing oxyalkylene glycol and from a carboxylic acid monomer (such as acrylic acid, methacrylic acid, maleic acid, (maleic anhydride), itaconic acid, fumaric acid, etc.) to graft copolymers of the abovementioned carboxylic acid monomers on polyoxyalkylene glycols or, respectively, derivatives of these (ethers, esters). These polanders, referred to below as polyoxyalkylene glycol carboxylates, may either be in the free acid form or in their salt form.

The advantage of copolymers of this time, for example in the sector for flow agent applications in the construction industry, is firstly the opportunity to use very small amounts to achieve long lasting handling qualities in cementaceous mixtures of construction materials (ready-mix concrete industry).

Secondly, the water requirement of these mixtures can be reduced so markedly that high-strength concretes can be produced (prefabricated). The products themselves are free from hazardous constituents, such as formaldehyde, and in this they differ from conventional cement flow agents, e.g. of EP-A 214 412 or DE-C 16 71 017. For numerous applications it is useful and desirable to prepare aqueous preparations of the abovementioned water-soluble polymers. However, if the polymers are to be used as an additive in dry mixes prepared in advance in the factory, the products have to be in a form which is solid and as finely dispersible as possible, i.e. in powder form.

Particular technical advantages of a powder, alongside logistical and economic advantages of powders over solutions, are improved storage stability and the absence of susceptibility to frost.

However, pulverulent polymers based on polyoxyalkylene glycol carboxylates tend to generate heat spontaneously, or even to autoignite, in particular if the powder has a very high specific surface area because it has been very finely ground, or if the amounts stored are large, for example in a silo. This tendency produces a major safety risk. Added to this is the fact that the relatively high temperatures occurring, and also the presence of atmosoheric oxygen, reduce the effectiveness of the products as the oxyalkylene glycol structural units undergo thermooxidative degradation processes.

The stabilizers or antioxidants known from the publications U.S. Pat. No. 4,070,304, U.S. Pat. No. 4,444,676, DE-A 2 557 619 and European Patent 38 876 comprise sterically hindered phenols, bisphenols, dialkyldiphenylamines, phenothiazines and substituted phosphites or mixtures of these classes of substance.

The effectiveness of the stabilizers firstly depends on the class of substance to which the particular representatives belong, and secondly is markedly affected by the compatibility with the substrate to be stabilized.

Many of the known stabilizers from the abovementioned groups are water-insoluble and are therefore highly suitable for stabilizing hydrophobic substrates, such as dispersion powders based on vinyl acetate, vinyl versetate, ethylene and 2-ethylhexyl acrylate (EP-A 751 175). As described in DE-A 42 26 288 and DE-A 43 00 892, the abovementioned water-insoluble stabilizers also have excellent comparability with pure substrates from the polyalkylene glycols group. They are therefore used successfully for thermooxidative stabilization of this class of substances.

However, problems occur if the extremely hydrophilic properties of the substrate to be stabilized make it incompatible with hydrophobic stabilizers, as is the case with the polyoxyalkylene glycol carboxylates described.

SUMMARY OF THE INVENTION

It was therefore an object of the present invention to develop water-soluble polymer powders which are based on polyoxyalkylene glycol carboxylates and which have been stabilized using conventional stabilizers to prevent spontaneous heating and thermooxidative decomposition.

According to the invention, this object was achieved by preparing stabilized polyoxyalkylene glycol carboxylate powders which comprise a stabilizer selected from the group consisting or phenols, amines, phosphites, thioethers, and also thioacids, in an amount adequate for stabilization, in particular from 0.01 to 10% by weight, based on the weight of the polymer powder. The stabilized powders are obtainable by adding the stabilizer in liquid or dissolved form to the aqueous polymer solution prior to its conversion into the powder form. Surprisingly, it has been found here that even hydrophobic stabilizers can be used to give excellent stabilization of the hydrophilic polyoxyalkylene glycol carboxylates, so that when a specimen of the polymer powder is heated at 140° C. for 24 h in air the temperature in the interior of the specimen does not exceed 200° C.

The water-soluble polymer powders which are to be stabilized and which are based on polyoxyalkylene glycol carboxylates are products which contain oxyalkylene glycol groups and carboxyl groups in their main and/or side chain. These polymers may have structures made from monomers based on unsaturated carboxylic acid (derivatives) and oxyalkylene glycol alkenyl ethers.

The polymers may also contain an unsaturated carboxylic acid as main chain and polyalkylene oxide side chains bonded via ester groups. Particularly suitable unsaturated carboxylic acids and, respectively, carboxylic acid derivatives are acrylic acid, methacrylic acid, maleic anhydride, maleic acid, fumaric acid, itaconic acid, and also itaconic anhydride. These polymers may be linear, short-chain branched, long-chain branched or else slightly crosslinked, and may be comb-shaped, star-shaped or dumbbell-shaped, or have other morphologies.

For the purposes of the present invention, the polymer powder to be stabilized may certainly also contain singly and/or multiply unsaturated vinyl- and/or acrylate-based monomers which are needed for the structure of the basic skeleton or on the side chains.

Examples of these are styrene, α-methylstyrene, vinyl acetate, isobutene, diisobutene, cyclopentadiene, ethylene, propylene, methyl acrylate, methyl methacrylate, butyl acrylate, 2-ethylhexyl acrylate, N-vinylpyrrolidone, acrylamide, methacrylamide, acrylamidomethylpropanesulfonic acid, styrenesulfonic acid, methyl vinyl ether, ethyl vinyl ether, allylsulfonic acid, butadiene and acrilonitrile.

Examples of the polymers stabilized according to the invention are polymers with a comb-type structure made from a methacrylic acid main chair and polyalkylene oxide side chains bonded via ester groups, maleic anhydridestyrene copolymers (partly) esterified with methylpolyethylene glycol, allylpolyethylene glycol-maleic acid copolymers, vinylpolyethylene glycol-maleic monoester copolymers, graft copolymers composed of a polyethylene glycol or, respectively, polypropylene glycol skeleton and maleic anhydride or, respectively, acrylic acid side chains, which themselves may in turn have been esterified or partly esterified, and also block copolymers made from methacrylic acid and ethylene glycol.

For stabilization to prevent autoignition, and also to prevent thermooxidative degradation of the polymers in powder form, use may be made of compounds based on phenols, and these can be divided into the following classes of compounds:

1. Alkylated monophenols having one or more alkyl radicals of from 1 to 18 carbon atoms, e.g. 2,6-di-tert-butyl-4-methylphenol, 2,6-di-tert-butylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-i-butylphenol, 2,6-dicyclopentyl-4-methylphenol, 2-(β-methyl-cyclohexyl)-4,6-dimethylphenol, 2,6-dioctadecyl-4-methylphenol, 2,4,6-tricyclohexylphenol, 2,6-di-tert-butyl-4-methoxymethylphenol, o-tert-butyl-phenol.
2. Alkylated hydroquinones having one or more alkyl radicals of from 1 to 18 carbon atoms, e.g. 2,6-di-tert-butyl-4-methoxyphenol, 2,5-di-tert-butylhydroquinone, 2,5-di-tert-amylhydroquinone, 2,6-diphenyl-4-octadecyloxyphenol.
3. Alkylidenebisphenols having an unsubstituted or substituted $C_1$–$C_4$-alkylidene radical, and/or sterically hindered polynuclear phenols, e.g. 2,2'-methylenebis(6-tert-butyl-4-methylphenol), 2,2'-methylenebis(6-tert-butyl-4-ethylphenol), 2,2'-methylenebis(4-methyl-6-(α-methylcyclohexyl)phenol), 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4- or -5-isobutylphenol), 2,2'-methylenebis(6-α-methylbenzyl)-4-nonylphenol), 2,2'-methylenebis(6-(α,α-dimethylbenzyl)-4-nonylphenol), 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)-butane, 2,6-di(3-tert-butyl-5-methyl-2-hyvdroxybenzyl)-4-methylphenol, 1,1,3-tris(5-tert-butyl-4-hydroxy-2-methylphenyl) 3-n-dodecylmercaptobutane, ethylene glycol-bis[3,3-bis(3'-tert-butyl-4'-hydroxyphenyl) butyrate], 3,8-bis(3-tert-butyl-4-hydroxy-5-methylphenyl)di-cyclopentadiene, bis[2-(3'-tert-butyl-2'-hydroxy-5'-methylbenzyl)-6-tert-butyl-4-methylphenyl] terephthalate, 2,2'-isobutylidenebis(4,6-dimethylphenol), 4,4'-butylidenebis(2-tert-butyl-5-methylphenol), 1,1,3-tris(2-methyl-4-hydroxy-5-tert-butylphenyl)butane.
4. Phenolic benzyl compounds, e.g. 1,3,5-tri(3,5-di-tert-butyl-4-hydroxybenzyl)-2,4,6-trimethylbenzene, bis(3,5-di-tert-butyl-4-hydroxybenzyl)sulfide, isooctyl 3,5,-di-tert-butyl-4-hydroxybenzylmercapto acetate, bis(4-tert-butyl-3-hydroxy-2,6-dimethylbenzyl)dithioterephthalate, tris(3,5-di-tert-butyl-4-hydroxybenzyl)1,3,5-isocyanurate, tris(4-tert-butyl-3-hydroxy-2,6-dimethylbenzyl) 1,3,5-isocyanurate, dioctadecyl 3,5-di-tert-butyl-4-hydroxybenzylphosphonate, the calcium salt of monoethyl 3,5-di-tert-butyl-4-hydroxybenzylphosphonate.
5. Phenol/diphenyl thioether compounds, e.g. 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol).
6. Acylaminophenols, e.g. 4-hydroxylauranilide, 4-hydroxystearanilide, 2,4-biscylmercapto-6-(3,5-di-tert-butyl-4-hydroxyanilino)-s-triazine, octyl N-(3,5-di-tert-butyl-4-hydroxyphenyl)-carbamate.
7. Phenolic esters, such as esters of β-(3,5-di-tert-butyl-4-hydroxyphenyl)propionic acid or of β-(5-tert-butyl-4-hydroxy-3-methylphenyl)propionic acid with mono- or polyhydric alcohols, e.g. methanol, diethylene glycol, octadecanol, triethylene glycol, 1,6-hexanediol, pentaerythritol, neopentyl glycol, trishydroxyethyl isocyanurate, thiodiethylene glycol, dihydroxyethyloxalamide.
8. Phenolic amides, such as amides of β-(3,5-di-tert-butyl-4-hydroxyphenyl)propionic acid, e.g. N,N'-bis(3,5-di-tert-butyl-4-hydroxyphenylpropionyl)-hexamethylenediamine, N,N-bis(3,5-di-tert-butyl-4-hydroxyphenylpropionyl)trimethylenediamine, N,N-bis (3,5-di-tert-butyl-4-hydroxyphenyl-propionyl)hydrazine.

Particular amine-based stabilizers used are secondary or tertiary amines having aliphatic, araliphatic, aromatic or cyclic radicals or N-heterocycles (e.g. unsubstituted or substituted phenothiazines, benzothiazines or quinolines). Examples of these are:

N,N'-diisopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis (1-methylheptyl)-p-phenylenediamine, N,N'-dicyclohexyl-p-phenylenediamine, N,N'-diphenyl-p-phenylenediamine, N,N'-di(naphth-2-yl)-p-phenylenediamine, N-isopropyl-N'-phenyl-p-phenylenediam, N-(1,3-dimethylbutyl)-N'-phenyl-p-phenylenediamine, N-(1-methylheptyl)-N'-phenyl-β-phenylenediamine, N-cyclohexyl-N'-phenyl-p-phenylenediamine, 4-(p-toluenesulfonamido) diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-phenyl-2-naphthylamine, octylated diphenylamine, e.g. p,p'-di-tert-octyldiphenylamine, 4-n-butylaminophenol, 4-butyrylaminophenol, 4-nonanoylamincphenol, 4-dodecanoylaminophenol, 4-octadecanoylaminophenol, di(4-methoxyphenyl) amine, 2,6-di-tert-butyl-4-dimethylaminomethylphenol, 2,4- diaminodiphenylmethane, 4,4'-diaminodiphenylmethane, N,N,N',N'-tetramethyl-4,4'-diaminodiphenylmethane, 1,2-di(phenylamino)ethane, 1,2-di[2-(methylphenyl)amino]ethane, 1,3-di(phenylamino)propane, (o-tolyl)biguanide, di[4-(1',3'-dimethylbutyl)phenyl]amine, tert-octylated N-phenyl-1-naphthylamine, mixtures made from mono- and dialkylated tert-butyl-/tert-octyldiphenylamines, 2,3-dihydro-3,3-dimethyl-4H-1,4-benzothiazine, phenothiazine, n-allylphenothiazine, styrenated diphenylamine, polymerized 2,2,4-trimethyl-1,2-dihydroquinoline.

Among the phosphites, stabilizers which may be used (esters of phosphorus acid) are compounds having aliphatic, araliphatic and/or aromatic radicals. Examples of these are: trimethyl phosphite, triethyl phosphite, triisobutyl phosphite, triphenyl phosphite and tris[4-nonylphenyl] phosphite.

Thioethers which have proven particularly suitable are esters of thiodiacetic acid or thiodipropionic acid, e.g. dilauryl 3,3'-thiodipropionate or distearyl 3,3'-thiodipropionate.

Among the thioacids, use is preferably made of dithiocarbamic and/or dithiophosohoric acid or salts thereof.

The stabilizers may be used either individually or in combination. Particular preference is given to the use of sterically hindered phenols and amines, and also phenothiazine.

The amounts added according to the invention depend on the: effectiveness of the stabilizer and are generally from 0.01 to 10% by weight, in particular from 0.1 to 1% by weight, based on the polymer powder, the particle size of which is preferably from 10 to 100 μm. In one preferred embodiment, the novel mixtures made from water-soluble polymer powder and stabilizer also comprise up to 5% by weight of a water-soluble aminosulfonic acid compound, such as amidosulphonic acid and/or taurine, in the form of the free acid or as a salt.

An important factor for the invention is that the stabilizer in liquid or dissolved form is added to the aqueous polymer solution prior to its conversion into the powder form, since only then does the thermooxidative stabilizing action become effective.

To emulsify the stabilizer in the aqueous polymer solution, the stabilizer is added, either in liquid or in dissolved form (for example in a suitable organic solvent) to the appropriate aqueous polymer solution, whereupon a microemulsion forms, made from stabilizer and polymer compound, and the size of the finely divided oil droplets of the stabilizer is <100 nm.

Surprisingly, the formation of this microemulsion is successful even without other additives in the form of surfactants or protective colloids, and also without the use of high-shear dispersion procedures.

In order to convert the microemusion composed of stabilizer and polymer compound into the powder form it is necessary to remove the liquid phase composed of water and of any organic solvent used, and this may readily be carried out by the usual methods, e.g. spray drying.

It has proved particularly advantageous here for the pH of the aqueous polymer solution prior to conversion into the powder form to be set to 6–10, preferably 7–9. The, solids content of the aqueous polymer solution here is preferably from 10 to 50% by weigh. With the aid of this emulsification step it is even possible to use hydrophobic compounds to stabilize the water-soluble polymer powders based on polyoxyalkylene glycol carboxylates, in which case polymer powder and stabilizer are converted by way of adsorptive interactions into an extremely finely divided colloidal system. The manner in which the colloid particles with their polyelectrolyte molecules are stabilized here, electrostatically (carboxyl groups) and also sterically (polyoxyalkenyl glycol groups), achieves a thermo-dynamically preferred state.

The large surface area resulting from the fine division of the stabilizer also means that every molecule of the substrate to be stabilized is reached, and this gives exceptional efficacy.

The polymer powders protected according to the invention against autoignition and oxidative degradation therefore have unexpectedly high thermooxidative stability, even when exposed to high temperatures and oxidizing action (air, oxygen).

DETAILED DESCRIPTION OF THE INVENTION

The examples below are intended to describe the invention in further detail.

EXAMPLES

Example 1

200 g of a 36% strength by weight solution of a copolymer made from 75 mol percent of methacrylic acid and 25 mol percent of an ester of methacrylic acid and methylpolyethylene glycol of average molar mass 1100 g/mol and having a random structure, in the form of its calcium salt, were charged at room temperature to a glass beaker. The solution, which had a pH of 7.2, was then mixed, with stirring, with 0.36 g of a stabilizer based on a styrenated diphenylamine marketed as ADDITIN RC 7135. This gave a stable emulsion, which was diluted with 200 g of water and converted into a powder in a NIRO-Atomizer laboratory spray dryer (inlet temperature 180° C., outlet temperature 105° C.). The resultant powder was treated with 0.30 g of fine-particle silica, in order to convert the powder into a free-flowing form. Agglomerated particles were removed by screening through an 80 μm screen, giving a white powder with an average particle diameter of 28 μm (air-jet screen analysis).

Comparative Example 1

Example 1 was repeated, but the spray drying took place without adding the ADDITIN RC 7135 stabilizer. The average particle diameter of the white powder obtained was 32 μm.

Comparative Example 2

The powder obtained in Comparative Example 1 was then mixed with 0.35 g of ADDITIN RC 7135 and then mixed for 36 hours on a roll mill. The average particle diameter of the remaining powder was 25 μm.

The ignition behavior of the powders was assessed as in "Testkriterien und Testverfahren zur Einstufung von gefährlichen Stoffen der Gefahrgutklassen 4.1, 4.2, 4.3 und 5.1 [Test Criteria and Test Methods for Assessing Hazardous Substances in Risk Classes 4.1, 4.2, 4.3 and 5.1"] (K. O. Storck Verlag, Hamburg):

Class 4.1 ignitable solids

Class 4.2 autoignitable substances

Class 4.3 substances which form ignitable gases on contact with water

Class 5.1 substances causing ignition (oxidation)

For allocation to Class 4.1 it must be ensured that no autoignition occurs and that the temperature in the interior of the specimen does not exceed 200° C. after storage for 24 h at 140° C. (internal temperature), when 1 l of powder (uncompacted, corresponding to 600–700 g) is subjected to prolonged heating in a cube-shaped wire cage of 10 cm edge length (Bowes-Cameron basket). If these criteria are not met, the allocation is to one of the Classes 4.2, 4.3 or 5.1, and the resultant increase in safety measures required during preparation, storage, distribution and handling is so great that it becomes questionable whether the material can be marketed.

To carry out the tests, a wire cage with specimen holder is filled with the polymer powder to be tested. The container is repeatedly tapped lightly and topped up again after the powder has settled. Finally, excess material is removed. The wire cage, completely filled with the test substance, is then placed in a drying cabinet preheated to 140° C., and a temperature sensor is placed in the center of the cube of material. A second temperature sensor is arranged in a graphite comparison specimen located in a DEWAR flask. The two temperatures are recorded continuously with the aid of the SIPCON test-result-recording system over a period of 24 h, and evaluated graphically.

Whereas the temperature measured in the polymer powder prepared as in Example 1 is constant at 140° C. over the entire 24-hour test period, the powder from Comparative Example 1 exceeds the 200° C. limit after only 3.7 hours, and within a short time its temperature increases to 464° C. with thermooxidative decomposition.

Comparative Example 2: the 200° C. limit was exceeded after 6.8 hours ($T_{max}$=430° C.)

The polyether carboxylate stabilized by the novel process can therefore be allocated to Hazardous Substance Regulations Class 4.1, whereas products from Comparative Examples 1 and 2 have to be allocated to the autoigniting substances group (Class 4.2).

Examples 2 to 10

0.60% by weight (based on the polymeric solid) of each of the following stabilizers (Table 1) was emulsified with the 35% strength by weight polymer solution described in Example 1.

TABLE 1

| Example | Stabilizer | Maximum specimen temperature (° C.) (storage at 140° C. for 24 h) |
|---|---|---|
| 2 | LOWINOX BHT[1] | 186 |
| 3 | LOWINOX AH25[2] | 181 |
| 4 | ADDITIN RC 7115[3] | 172 |
| 5 | LOWINOX 44 S 36[4] | 159 |
| 6 | IRGANOX P 1010[5] | 142 |
| 7 | VULKANOX OCD[6] | 140 |
| 8 | phenothiazine | 143 |
| 9 | IRGANOX PS 802[7] | 154 |
| 10 | HOSTANOX OSP1[8] | 140 |
| COMP. 3 | none added | 464 |

[1]2,6-di-tert-butyl-4-methylphenol (Great Lakes)
[2]2,5-di-tert-amylhydroquinone (Great Lakes)
[3]2,2'-methylenebis(6-tert-butyl-4-methylphenol) (Rhein Chemie)
[4]4,4'-thiobis(2-tert-butyl-5-methylphenol) (Great Lakes)
[5]pentaerythrityl tetrakis-3-(3',5'-di-tert-butyl-4'-hydroxyphenyl)propionate (Ciba)

TABLE 1-continued

| Example | Stabilizer | Maximum specimen temperature (° C.) (storage at 140° C. for 24 h) |
|---|---|---|

[6]octylated diphenylamine (Bayer)
[7]distearyl 3,3'-thiodipropionate (Ciba)
[8]tris[2-tert-butyl-4-(2-methyl-4-hydroxy-5-tert-butyl)phenylmercapto-5-methylphenyl] phosphite (Clariant)

In no case is the critical temperature threshold of 200° C. exceeded by the mixtures stabilized according to the invention.

Examples 11 to 20

The stabilizers used in Examples 1 to 10 were used as in the process described in Example 1 for stabilizing the polymers given in the examples below (Table 2):

TABLE 2

| Example | Polymer[1] | Stabilizer | Maximum specimen temperature (° C.) (storage at 140° C. for 24 h) |
|---|---|---|---|
| 11 | A | ADDITIN TC 7135[2] | 140 |
| 12 | B | ADDITIN RC 7135[2] | 141 |
| 13 | C | ADDITIN RC 7135[2] | 140 |
| 14 | D | ADDITIN RC 7135[2] | 139 |
| 15 | A | LOWINOX 44 S 36[3] | 163 |
| 16 | B | phenothiazine | 149 |
| 17 | C | IRGANOX PS 802[4] | 142 |
| 18 | D | ADDITIN RC 7115[5] | 164 |
| 19 | A | ADDITIN RC 7115[6] | 148 |
| 20 | A | phenothiazine | 142 |

[1]polymer characteristics (products where in Na salt form);
A: 1:1 copolymer made from styrene and maleic anhydride ($M_n$ = 19,000 g/mol), partly esterified to an extent of 50 mol % with methylpolyethylene glycol-1100
B: 1:1 copolymer made from methylpolyethylene glycol-1100 monovinyl ether and maleic anhydride ($M_n$ = 23,000 g/mol)
C: 1:1 copolymer made from allylpolyethylene glycol-1100 and maleic anhydride ($M_n$ = 13,000 g/mol)
D: graft copolymer made from methylpolyethylene glycol-500 and maleic anhydride (molar ratio 1:1.8) partly esterified to an extent of 50 mol %
[2]styrenated diphenylamine (Rhein Chemi)
[3]cf. Table 1
[4]cf. Table 1
[5]cf. Table 1
[6]0.26% (weight in relation to polymeric solid) of Na salt of taurine also used The results obtained for polymers A to D without adding stabilizers were (Table 3):

TABLE 3

| Example | Polymer[1] | Maximum specimen temperature (° C.) (storage at 140° C. for 24 h) |
|---|---|---|
| Comparison 4 | A | 416 |
| Comparison 5 | B | 458 |
| Comparison 6 | C | 452 |
| Comparison 7 | D | 469 |

[1]characteristics of polymers: cf. Table 2

What is claimed is:

1. A stabilized, water-soluble polymer powder based on polyoxyalkylene glycol carboxylates, wherein the powder comprises a stabilizer selected from the group consisting of phenols, amines, phosphites, thioethers, and thioacids, in an amount adequate for stabilization, and said powder is obtained by adding the stabilizer in liquid or dissolved form to the aqueous polymer solution prior to its conversion into the powder form.

2. The polymer powder as claimed in claim 1, wherein the polymers have been built up from monomers based on unsaturated carboxylic acids or derivatives of these and from oxyalkylene glycol alkenyl ethers.

3. The polymer powder as claimed in claim 1, wherein
the polymers contain an unsaturated carboxylic acid as main chain and polyalkylene oxide side chains bonded via ester groups.

4. The polymer powder as claimed in claim 1, wherein the polymers contain other vinyl- and/or acrylate-based monomers.

5. The polymer powder as claimed in claim 1, wherein the amount of the stabilizer is from 0.01 to 10% by weight and in particular from 0.1 to 1% by weight, based on the polymer powder.

6. The polymer powder as claimed in claim 1, wherein the stabilizer comprises an alkylated monophenol having at least one alkyl radical or an alkylated monophenol having from 1 to 18 carbon atoms.

7. The polymer powder as claimed in claim 1, wherein the stabilizer comprises an alkylated hydroquinone comprising at least one alkyl radical having from 1 to 18 carbon atoms.

8. The polymer powder as claimed in claim 5, wherein the stabilizer comprises at least one phenol compound selected from the group consisting of an alkylidenebisphenol having a $C_1$–$C_4$-alkylidene radical and an alkylidenebisphenol having a sterically hindered polynuclear phenol.

9. The polymer powder as claimed in claim 1, wherein the stabilizer comprises a phenolic benzyl compound.

10. The polymer powder as claimed in claim 1, wherein the stabilizer comprises at lest one of a phenol thioether compound or a biphenyl thioether compound.

11. The polymer powder as claimed in claim 1, wherein the stabilizer is an acylaminophenol.

12. The polymer powder as claimed in claim 1, wherein the stabilizer is an ester of β-(3,5-di-tert-butyl-4-hydroxyphenyl) propionic acid or β-(5-tert-butyl-4-hydroxy-3-methylphenyl) propionic acid.

13. The polymer powder as claimed in claim 1, wherein the stabilizer is an amide of β-(3,5-di-tert-butyl-4-hydroxyphenyl) propionic acid.

14. The polymer powder as claimed in claim 1, wherein the stabilizer is selected form the group consisting of a secondary amine a tertiary amine, and an N-heterocycle.

15. The polymer powder as claimed in claim 14, wherein the N-heterocycle is at least one N-heterocycle selected from the group consisting of a substituted phenothiazine, an unsubstituted phenothiazine, a substituted benzothiazine, an unsubstituted benzothiazine, a substituted quinoline, and an unsubstituted quinoline.

16. The polymer powder as claimed in claim 1, wherein the stabilizer is a phosphite having at least one radical selected from the group consisting of an aliphatic radical, an araliphatic radical and an aromatic radical.

17. The polymer powder as claimed in claim 1, wherein the stabilizer based on a thioether comprises an ester of thiodiacetic acid and/or thiodipropionic acid.

18. The polymer powder as claimed in claim 1, wherein the stabilizer. Is at least one thioacid selected from the group consisting of dithiocarbamic acid, dithiophosphoric acid, a salt of dithiocarbamic acid, and a salt of dithiophosphoric acid.

19. The polymer powder as claimed in claim 1, wherein the particle size of the powder is from 10 to 100 μm.

20. The polymer powder as claimed in claim 1, wherein the powder also comprises up to 5% by weight of a water-soluble aminosulfonic acid compound.

21. The polymer powder as claimed in claim 20, wherein the aminosulfonic acid compound is selected from the group consisting of amidosulfonic acid, taurine free acid, taurine salt, and a combination thereof.

22. The polymer powder as claimed in claim 1, wherein when a specimen of the powder is heated at 140° C. for 24 h the temperature in the interior of the specimen does not exceed 200° C.

23. A process for preparing a stabilized, water-soluble polymer powder based on polyoxyalkylene glycol carboxylates comprising the steps of:
(a) adding a stabilizer selected from the group consisting of phenols, amines, phosphites, thioethers, and thioacids, in an amount adequate for stabilization, in liquid or dissolved form, to an aqueous solution of a polymer based on polyoxyalkylene glycol carboxylates, to form a microemulsion, and then
(b) converting the polymer into the powder form by removing the liquid phase.

24. The process as claimed in claim 23, wherein the aqueous polymer solution has a solids content of from 10 to 50% by weight.

25. The process as claimed in claim 23, wherein the pH of the aqueous polymer solution is adjusted to 6–10 prior to conversion into the powder form.

26. The process as claimed in claim 25, wherein the pH of the aqueous polymer solution is adjusted to 7–9 prior to conversion into the powder form.

27. The process as claimed in claim 14, wherein said secondary amine and said tertiary amine have aliphatic, araliphatic, aromatic or cyclic radicals.

28. The process as claimed in claim 23, wherein the liquid phase is removed by drying.

29. The process as claim 28, wherein said drying is spray drying.

* * * * *